3,549,473
BINDER COMPOSITION AND USES
John R. Le Blanc and Harold P. Higginbottom, Wilbraham, Mass., assignors to Monsanto Company, St. Louis, Mo., a corporation of Delaware
No Drawing. Continuation-in-part of application Ser. No. 535,678, Mar. 21, 1966. This application Jan. 2, 1968, Ser. No. 694,877
Int. Cl. B32b *17/04;* C04b *21/06;* C08g *51/04*
U.S. Cl. 161—93                               6 Claims

ABSTRACT OF THE DISCLOSURE

Liquid binder compositions adapted for application to inorganic materials and incorporating both an organic binder and an inorganic binder. These compositions can be used to produce three-dimensional bodies having wide-range thermal insulation capabilities and high strength properties over such range.

RELATED APPLICATION

This application is a continuation-in-part of our earlier filed U.S. patent application Ser. No. 535,678, filed Mar. 21, 1966, now abandoned.

BACKGROUND

Although in the art of making insulation there has long been an understanding of how to make heterogeneous three dimensional structures from phenolic resins and inorganic fibrous materials, and although in the art of making ceramic bodies there has long been an understanding of how to make heterogeneous three dimensional structures from refractory binders and inorganic fibrous materials, it has been very difficult to combine the two technologies so as to produce a heterogeneous three dimensional structure which combines the best properties of both organic and inorganic binder systems. The art of making insulation has long desired to have ceramic-like materials which characteristically have high strength and high thermal insulation properties over a wide temperature range say from about 20° C. to 1150° C.

To make such materials, some combination of both organic and inorganic binder systems is necessary. This is so because, as a practical matter, organic binders oxidize and combust at temperatures usually between about 250° C. and 800° C., while inorganic binders do not gain strength until after firing at temperatures over about 800° C. for an appropriate time (depending on materials).

However, it is difficult to produce a blend of organic and inorganic binders for inorganic fibrous materials which will not only display uniform strength and insulation properties with increasing temperatures, but which can subsequently be reheated following a first heating for an indefinite number of cycles. Typically the organic binder burns away too rapidly at low temperatures, or the inorganic binder does not function properly to fuse to the inorganic fibers after and during burn off of organic binder and thereby form a structure with good strength properties over a wide temperature range.

Various systems have been employed as binders. Organic resins of the thermosetting type possess many desirable characteristics for use as binders as distinguished from inorganic materials as binders in the manufacture of thermal insulation. However, the organic resins are not capable of withstanding temperatures in excess of about 450° F. and thus break down and deteriorate under conditions of manufacture and use of high temperature insulation with the resultant loss of bondage. Various proposals have been set forth in the art to improve the temperature stability of organic resins by modifying the resins with nitrogeneous materials, by admixing or combining various resins, by adding organo borates and/or organo silanes to the resins, by combining the resins with various clays, and the like. Although notable improvements in temperature degradation of resins have been accomplished by such proposals, other important properties, such as bonding strength, moisture resistance and solution stability of the binder system, have been sacrificed without obtaining desirable bonding retention at temperatures about and even above 1000° F. (500° C.).

There has now been discovered a liquid binder system which combines both an organic binder and an inorganic binder into a single system, and which is adapted for easy, conventional application to the surfaces of various inorganic materials, especially fibrous materials. Furthermore, insulative materials made from this binder system display superior strength and thermal insulative properties over a wide temperature range (e.g., from about 20 to 900° C.).

SUMMARY

This invention is directed to liquid binder compositions adapted for use in the manufacture of heterogeneous three-dimensional thermal insulation structures. This invention is also directed to the resulting structures themselves.

The liquid binder compositions contain up to about 70 weight percent total solids and comprise:

(a) An inert, evaporatable liquid carrier selected from the group consisting of water, polar volatile organic liquids, and mixtures thereof, (b) At least one inorganic metal oxide refractory binder material capable of fusion at temperatures in excess of about 800° F. and being in the physical form of solid particles having a maximum size of less than about 10 microns each, said refractory binder being dispersable in said liquid carrier, (c) An aminoplast modified phenol-aldehyde resole resin substantially completely dissolved in said liquid carrier, and (d) A nonmetallic phosphate material selected from the group consisting of phosphoric acid, ammonium phosphates, lower alkyl phosphates, lower alkoxyalkyl phosphates, phosphate esters of phosphoric acid with monohydric and polyhydric lower alkanols, lower alkanolamine salts of phosphoric acid, and mixtures thereof, said phosphate material being substantially completely dissolved in said liquid carrier.

In such binder composition, there are present, for each 100 parts by weight of said refractory oxide from about 5 to 30 parts by weight of said resole resin. Also in such binder composition there is present such a quantity of said phosphate material relative to said resole resin that a dry mixture of said resole resin and said phosphate material requires from about 2 through 15 minutes for said resole resin to cure at 150° C.

Because of inherent differences possible between various aminoplast modified phenol-aldehyde resins, there does not appear to be any constant relationship between such resin and such phosphate material, and such relationship as there is depends upon the individual respective characteristics (chemical and physical) of the particular resin and the particular phosphate material used in any given composition. Typically, as a sort of general "rule-of-thumb," one can use, for each 5 to 60 parts by weight of such resin, from about 20 to 60 parts by weight of such phosphate material. It is preferred, however, to use resin cure rate to determine the amount of phosphate material to be used in any given instance. One procedure which may be used to measure such rate is the well-known so-called Hot Plate Dry Rubber Determination used in the phenolic art.

In preparing a binder composition of this invention, one can use any known inorganic metal oxide refractory binder material capable of fusion at temperatures in excess of about 700° C. Examples of such suitable binder materials include clay (including any of the great variety of aluminum silicate-bearing rocks of various compositions and degrees of purity), zinc oxide, iron oxide, magnesium oxide, mica, lime, hydrated alumina, and the like. Examples of suitable clays include kaolins, bentonites, cryolite, and the like. A preferred refractory material is a 50–50 combination of hydrated alumina and kaolin clay.

Preferably, such binder materials should have a maximum particle size of less than about 5 microns each. In general, such binder materials are well-known to those of ordinary skill in the art and do not form part of the present invention.

In preparing a binder composition of this invention, one can use any known aminoplast modified phenol-aldehyde resin. The term "aminoplast" as used herein has reference to one or more compounds selected from the group consisting of dicyandiamide, melamine, and urea. Dicyandiamide is preferred.

Aminoplast modified phenol-aldehyde resins suitable for use in this invention may be made by techniques taught by Mesdagh et al. in U.S. Pat. 3,004,941. Aminoplast modified resins of phenol and formaldehyde are preferred.

Thus such a modified phenol-formaldehyde resin usable in this invention can be prepared by first condensing from about 1.5 to 5 mols of formaldehyde per mol of phenol. Preferentially, the condensation is accomplished using an alkaline catalyst. The condensation is continued until a predetermined free formaldehyde content is reached, as determined, for example, by the hydroxylamine hydrochloride test. A suitable free-formaldehyde content is about 9–15 weight percent based on total weight of starting reactants. The formaldehyde used in the starting reactants can be in the ratio range of about 1.5 to 5 mols per mol of phenol, and, preferably, ranges from about 1.5 to 3.5 mols of formaldehyde per mol of phenol. Such aqueous condensation product of phenol and formaldehyde, having the excess formaldehyde, is cooled to about 30 to 50° C. The aminoplast (dicyandiamide, melamine, or urea, or mixture thereof) is then added in such a proportion that the ratio is generally, and, preferably, about 1 mol of the aminoplast to about 0.5 to 2.0 mols of formaldehyde in the resulting formaldehyde condensation product with dicyandiamide, melamine, and/or urea and, more preferably, about 1.2 to 1.6 mols of formaldehyde. For example, when employing a mixture of dicyandiamide, melamine, and urea, the mixture can consist of from about 10 to 90 weight percent of dicyandiamide and, correspondingly, about 90 to 10 weight percent of urea.

Alternatively, the process for preparing an aminoplast modified phenol-formaldehyde resin for use in this invention can be accomplished by reacting dicyandiamide, melamine, or urea, or mixture thereof, with formaldehyde in the presence of an alkaline catalyzed reaction product of phenol-formaldehyde having no excess free formaldehyde. This process can be initiated by first reacting phenol with formaldehyde under alkaline catalyzed conditions to provide a water-dilutable condensate of phenol-formaldehyde having no free formaldehyde. The ratio of formaldehyde to phenol, and of aminoplast to formaldehyde remains as above indicated.

Other methods known to the art can be used for preparing such a modified resin for use in this invention. Typically, such methods involve the separate preparation of a phenol-aldehyde condensate resin composition which is initially not only water soluble but also water dilutable to the extent desired. The dicyandiamide, melamine and/or urea formaldehyde condensation product, as those skilled in the art readily appreciate, can be prepared separately by conventional techniques in the form of a resin which is typically not only water soluble, but also water dilutable to the extent desired. Such a separately prepared formaldehyde condensation product with dicyandiamide, melamine or urea can have a mol ratio of dicyandiamide melamine and/or urea to aldehyde of from about 0.5 to 5. The resin is then added to the preformed phenol-aldehyde resin. Preferably aminoplast modified phenol-aldehyde resins for use in this invention have a total nitrogen content ranging from about 3 to 12 weight percent (dry weight basis), and, in general, this nitrogen content is less than about 18 weight percent.

It is to be noted that, in a resin composition for use of this invention, the chemical composition of such an aminoplast phenol-aldehyde resin can itself vary. For example, although during the reaction of the condensates, the phenol, the dicyandiamide, the melamine, and/or the urea will preferentially react with the aldehyde, it is expected that certain other reaction products will also form during the condensation reaction. These products would be, for example, a phenol-dicyandiamide-formaldehyde reaction product. When employing a mixture of dicyandiamide and urea, a phenol-dicyandiamide-urea-formaldehyde reaction product can form as well as a mixture of phenol-dicyandiamide-formaldehyde, phenol - dicyandiamide-urea-formaldehyde and phenol-urea-formaldehyde reaction products. It is understood that these reaction products would only exist in minor amounts with the predominant portion of the condensation reaction products being phenol-formaldehyde and dicyandiamide-formaldehyde, or mixtures of dicyandiamide-formaldehyde and urea-formaldehyde. In general, the preparation of aminoplast modified phenol-aldehyde is known to those skilled in the art and does not form a part of the present invention. As those skilled in the art will appreciate, the aminoplast modified phenol-aldehyde resins used in the present invention are of the resole type since not only is the phenol-aldehyde condensation conducted under basic catalysis conditions, but also the aminoplast modification thereof is conducted under basic catalysis conditions.

In preparing a binder composition of this invention, one can use any known non-metallic phosphate material in the above described grouping. In addition to phosphoric acid itself, examples of ammonium phosphates include $NH_4H_2PO_4$, $(NH_4)_2HPO_4$ and $(NH_4)_3PO_4$. Examples of lower alkyl phosphates include ethyl ammonium phosphate, diethyl phosphate, ethyl ammonium phosphate, n-propyl ammonium phosphate, and the like. Examples of lower alkoxyalkyl phosphates include di(ethoxyethyl) hydroxyphosphate and the like. Examples of phosphate esters of phosphoric acid and lower alkanols include ethanol phosphate, glycerolphosphates, and the like. Examples of lower alkanolamine salts of phosphoric acid include ethanolamine phosphate, and the like. It is preferred that a given binder composition of the invention contain at least one organo phosphate. Preferred organo phosphates include ethyl ammonium phosphate and butyl ammonium phosphate. As used herein, the term "lower" has reference to less than 7 carbon atoms per molecule.

In preparing a binder composition of this invention, one can use any known inert evaporatable liquid carrier. The term "evaporatable" and the term "volatile" each have reference to the fact that a liquid when exposed to air at room temperature, pressure, and humidity conditions will vaporize substantially completely. Although water is the preferred liquid carrier, polar volatile organic liquids may be advantageously employed. Such liquids include alcohols such as ethanol; esters, such as methylacetate; ketones, such as methyl ethyl ketone; and the like.

As indicated above, it is desirable that both the aminoplast modified phenol-aldehyde resole resin and the nonmetallic phosphate material be substantially completely dissolved in the liquid carrier. Minor amounts, say up to 5 or 7 weight percent of each such material may not be truly dissolved (especially in concentrates) but such deviations are within the contemplation of this invention in the word "substantially." The binder material, since it is in a finely divided form, tends to disperse readily in most liquid carriers, and to settle out very slowly, if at all, therefrom. Typically, as a sort of general "rule-of-thumb," one can use for each 5 to 60 parts by weight of such resin from about 20 to 60 parts by weight of such refractory material, but it is preferred to employ the quantities of each above indicated.

In preparing a binder composition of the invention, a convenient procedure is to first prepare the aminoplast modified phenol-aldehyde resole resin as above described in the form of a concentrated solution of the resin in the particular carrier it is desired to use.

To prepare a solution of an aminoplast modified phenolaldehyde resin in a non-aqueous polar solvent from an aqueous solution thereof, one convenient procedure is to dehydrate the aqueous solution, as by vacuum distillation, and then to dissolve the resin residue in a polar organic solvent, such as ethyl alcohol or the like.

Then one can add to this system the desired type and quantity of refractory material, after which one can add the phosphate material. In general, any convenient method of preparation may be employed.

A binder composition of this invention in general is prepared by physically mixing the components together. For examples, the mixing can be accomplished in one step where all of the components are combined simultaneously, or in two steps where two components are first combined into a mixture and then the other component is added thereto. When the two-step mixing is employed, the refractory material and phosphorous compound are generally combined first to prevent any chemical combination of the phosphorous compound and the thermosetting resin. The individual components are combined in sufficient quantities so that a binder composition typically contains 5 to 60 weight percent of the thermosetting resin, 20 to 60 weight percent of the refractory material, all based on the total weight of the composition.

Optionally to a binder composition of the invention, one may add small amounts (e.g., from about 5 to 15 weight percent of the total composition) of an organo silicate. Such organo silicates enhance the initial bonding strength and the stability of aqueous binder dispersions of this invention. In addition, such silicates cut down structural damage caused to highly alkaline silicate glasses when such are used as the inorganic macroscopic material in a product three-dimensional structure.

A presently preferred organo silicate is a quaternary ammonium silicate. Examples of such silicates are found in Ralph Iler "Colloid Chemistry of Silica and Silicates" 1955 Cornell University Press, Ithaca, N.Y., QD549I4 (pages 30–31, 223, 225–226).

As those skilled in the art will appreciate, the phosphate material and the refractory material coact to improve the hot strength of a three-dimensional ceramic structure made using the binder composition of this invention and replace the binder function of the organic aminoplast modified phenolic resin with increasing temperatures. With increasing temperatures, such resin is pyrolyzed at a slow or controlled rate with little exotherm. As such resin combusts, the phosphate and the refractory begin to function as a binder at a slow or controlled rate. The transition from organic bond to inorganic bond is thus accomplished smoothly, and a product ceramic structure is characteristically relatively dust-free (of uncombined small sized inorganic components).

The binder compositions of this invention can be used to make relatively low temperature insulation materials by binding together appropriate inorganic fibrous materials, to form insulation structures generally like those appreciated by the prior art. However, these binder compositions are also especially useful for making novel heterogeneous three-dimensional structures characterized by having characteristically high strength and characteristically high thermal insulation properties over a temperature range extending from about 20° C. to 900° C. Such structures find use in a wide variety of applications; in general, wherever there is a need for high temperature insulation or broad-band temperature insulation, e.g., for ablation, for high temperature fluids like polyphenyl ethers, and the like.

In such a heterogeneous three-dimensional structure one employs preformed macroscopic inorganic materials selected from the class consisting of aluminiferous, titaniferous, and siliceous particles having a minimum average size of more than about 100 microns each. These inorganic materials are bonded together into a matrix by means of a binder composition of this invention.

The procedure for such a bonding together involves the steps of first applying (as by spraying, dipping, painting, or the like) such a binder composition at least between contiguous surfaces to be joined together of said inorganic materials, and then thereafter exposing the so coated surfaces to sufficient heat energy substantially to cure (cross-link) the resole resin portion thereof, thereby to form the desired heterogeneous three-dimensional structure.

These structures can be made in various forms. Some embodiments are of relatively low bulk density wherein the bulk density ranges from about one pound per cubic foot to about 3 pounds per cubic foot. Others have relatively high bulk densities ranging from about 0.5 gram per cubic centimeter to 2.2 grams per cubic centimeter. Preferably, the low bulk density embodiments are siliceous and are in a substantially fibrous and randomly arranged form. In these embodiments, the average fiber length to width ratio ranges from about 10:1 to 100,000:1 or even higher.

In other embodiments, such as those of high bulk density, the inorganic materials are also preferably siliceous and incorporate at least one woven mat or fabric of fibrous inorganic materials. In a preferred form, there are a plurality of generally parallelly positioned layers of such which are spaced from and bound to one another by means of said binder composition so as to form a laminate configuration. Such laminates are made by conventional coating and impregnation techniques. These laminates are useful for applications requiring high temperature integrity, for example, surfaces of super sonic aircraft. In these applications the resin is burned off slowly and the laminate retains its integrity before and during fusion of the inorganic binder.

Surprisingly strong and effective insulative bodies are formed by subjecting a structure as described above to temperatures both sufficient to substantially completely burn away organic portions thereof and sufficient to fuse together inorganic portions thereof. The resulting body is a ceramic with good structural integrity.

In the fabrication of insulation, generally a fibrous insulating material is impregnated with a binder composition which is then heated to set the binder and establish the bond. Glass fibers are generally the preferred insulating material for high temperature applications because they can be continuously subjected to temperatures in the order of 1200° F. without appreciable deterioration. Various types of glass fibers and wools suitable as high temperature insulation are known in the art as well as the processes for producing them. Other material having recognized insulating properties are rock wool and asbestos. The binder composition of this invention can be used effectively with any type insulating material.

The binder composition of this invention is deposited onto fibrous insulating materials and cured by any of the various methods known in the art. Those methods generally employed are spraying the binder composition onto the fibers during formation of interfelted mats or batts; spraying, dripping or flow coating a mat of the fibrous insulating material with a solution of the composition; or slurrying the fibrous insulating material into a solution of the composition with subsequent devolitization of the liquid medium. The setting of the binder and establishing the bond is accomplished by heating.

The amount of binder composition employed with the insulating material will depend upon the particular insulating material being used and the application for which it is designed. The amount of binder solids applied to the insulating material generally will range from 1 to about 25% by weight of the insulating material. Satisfactory bonding strength for insulation can be obtained both before and after exposure to temperatures in the order of 1000° F. with only minor quantities, e.g., less than 5% of the antipunk resin associated with the insulating material. For obtaining insulation having low specific gravity, quantities of the binder composition in the lower portion of the applicable range will be employed and vice versa for obtaining insulation having a higher specific gravity. The quantity of binder composition employed will also be chosen in regards to the type of curing cycle desired for the insulation.

The success of the composition of this invention for binding insulation material to form a product capable of withstanding high temperatures is the formation of a primary bond produced by the organic resin which is sufficiently strong and capable of withstanding sufficiently high temperatures to hold the initially bonded insulation material for the formation of a secondary bond produced by the inorganic material. The secondary bond thus formed is capable of withstanding temperatures up to 1000° F. without loss of bonding strength. In the past, when only inorganic materials have been employed as the binder material, the inorganic material becomes powdery and dusty with formation of only a weak bond. Since the organic resins are not capable of withstanding the high temperatures, they decompose, losing the bonding strength and thus break down the insulating material. Furthermore, accompanying resin decomposition is an exotherm which incurs damage to glass insulating material. In the past, a combination of an organic resin and an inorganic material as a binder composition has not been completely satisfactory because of the inherent disadvantages of both components.

The presence of a phosphorus-containing compound with a combination of an organic resin and an inorganic material allows the ratio of the organic resin and inorganic material to be adjusted so that the desirable binding properties of each component are retained while the disadvantages of each component are reduced. The presence of the phosphorus-containing compound permits the use of less organic resin while still obtaining a satisfactory initial bond and accordingly incurs less exotherm during decomposition of the resin. Likewise, the phosphorus-containing compound permits the use of more inorganic material in the composition thus obtaining an improved secondary bond. The secondary inorganic bond is improved through the "in situ" formation of aluminum phosphate through the reaction of the phosphorus-containing compound and hydrated alumina.

Other important factors and advantages of the composition of this invention are the improved processability of the composition as a binder for insulating material. The improved processability is obtained by the increased stability of the inorganic-organic composition in aqueous suspensions. In the past when employing clays in a binder composition, settling of the clay out of solution has been a major problem. The composition has adequate stability with retention of technological application utility after storage for several weeks and over a wide range of temperatures. The addition of an organo silicate to the composition of this invention further increases the stability of the composition in solutions. The stability of a binder composition in solution is important because the composition must be applied uniformly to the insulating material. Accordingly, a binder composition must be sufficiently stable in solutions for application of the composition onto the fibrous insulating material in a uniform distribution. Another important factor improved by the composition of this invention is the curing of the composition for establishing the primary and secondary bonds. The presence of an organo-phosphate compound in the composition reduces the precure tendencies and thus forms stronger bonds.

The composition of this invention also produces a bond which is moisture resistant with no appreciable change in bonding strength between wet and dry conditions. The insulation formed is flexible, retains its shape, and does not become dusty or powdery.

EMBODIMENTS

The following additional examples are set forth to illustrate more clearly the principles and practices of this invention to one skilled in the art, and they are not intended to be restrictive but merely to be illustrative of the invention herein contained. Unless otherwise stated, all parts and percentages are on a weight basis.

Examples 1–8

In these examples there is employed an aqueous aminoplast modified phenol-aldehyde resin made according to the teachings of Example II of U.S. Pat. 3,004,941.

To eight different samples of this resin are added various combinations of components to produce as many binder compositions of the invention. To the resin solution are added first the kaolin clay and hydrated alumina (each less than 5 microns). Then the phosphate and silicate (if used) are added with agitation. In each composition both the resin and the phosphate material are substantially completely dissolved, while the refractory material is suspended and dispersed.

The amount of phosphate used in each example is sufficient to make the cure time for the aminoplast modified phenol-aldehyde resin extend from 1 to 40 minutes at 120° C. for a mixture of phosphate and resin using the Hot Plate Dry Rubber Determination method.

The composition of each such binder formulation is summarized below in Table I:

TABLE I

| Components | Example Numbers and parts by weight | | | | | | | |
|---|---|---|---|---|---|---|---|---|
| | 1 | 2 | 3 | 4 | 5 | 6 | 7 | 8 |
| Resin [1] | 30 | 10 | 10 | 15 | 55 | 40 | 20 | 20 |
| Buca clay (kaolin) | 23 | 29 | 36 | 50 | 30 | 20 | 25 | 25 |
| Hydrated alumina | 8 | 7 | | | | 20 | 25 | 25 |
| EAP [2] | | 54 | 54 | 30 | 20 | 20 | 25 | |
| MAP [3] | 39 | | | | | | | |
| BAP [4] | | | | | | | | 25 |
| Silicate [5] | | | | 10 | 5 | | 5 | 5 |

[1] An antipunk resin of phenol-formaldehyde dicyandiamideformaldehyde produced in accordance with Example II of U.S. Patent 3,004,941.
[2] Ethyl ammonium phosphate.
[3] Mono ammonium phosphate.
[4] Butyl ammonium phosphate.
[5] Quaternary ammonium silicate, commercially identified as "Quarum 223," a product of Philadelphia Quartz Co.

The product binder composition of each example is adjusted so as to have a total solids content of about 40–65 weight percent.

The compositions of Examples 1 through 8 formulated as above all exhibit satisfactory stability in solution. Compositions of Examples 4, 5 and 6 possess a longer solution stability life than the others. All of the above formulations form a satisfactory primary bond using the organic portion with glass insulating material and a secondary inorganic bond of the insulation which is stronger and less dusty than conventional inorganic or organic or inorganic-organic binder systems. Insulation produced from glass fibers with any of the above formulated compositions is flexible, strong, moisture resistant, and withstands temperatures up to those which deteriorate theg lass fibers.

Each of the binder compositions of Examples 1 through 8 is now diluted with water so as to produce a composition having a total solids content of about 5 weight percent. In a separate operation, a non-woven glass mat is prepared comprising a low density (about 2 pounds per cubic foot) matrix of randomly arranged glass siliceous fibers each typically having length to width ratios in excess of about 10:1.

Different individual samples of this glass mat are sprayed with one of each of the diluted solutions above prepared to produce treated mats having a binder content of approximately 30 weight percent. Each resulting mat is then dried to remove water and exposed to a temperature of about 200° C. for approximately 5 minutes whereby a substantially complete cure of the organic binder position of the binder composition of this invention is accomplished. In each of the cooled mats the fibers are bound together by the binder composition of this invention.

The cooled product mats display excellent strength and thermal insulation properties over temperatures ranging from about 20° C. to 400° F. with substantially no deterioration of the organic resin binder therein.

However, when each of these product mats is exposed gradually to increasing temperatures over a period of time ranging about 4 to 5 hours so that at the end of this time, each mat is raised from a temperature of about 20° C. to 1000° F., (500° C.), it is observed that the organic resin portion of each mat of this invention is substantially completely pyrolyzed away (as shown by weight measurements). The so-heated mats are maintained in this heated atmosphere at this temperature for about 24 hours after which they are removed and examined. These so treated product ceramic mats are found to have excellent strength and thermal insulation properties.

Generally equivalent results are obtained when one uses, instead of siliceous fibers, aluminiferous fibers, or titaniferous fibers, each of approximately the same physical dimensions, to produce product mats.

EXAMPLE 17

A woven glass cloth formed of glass yarn having a tensile strength of from about 215,000 p.s.i., an elongation of about 2.5%, and a specific gravity of about 2.54 is impregnated by dipping into a binder composition of Example 1 but diluted as described in Examples 8 through 14. The resulting structure is air dried to remove excess moisture and then cut up into sheet of approximately equal dimensions each.

These sheets are then stacked in deck fashion so as to form a five-layered laminate pack. This pack is then impregnated with a binder composition of Example 1 but diluted as in Examples 8 through 14 so as to contain approximately 40 weight percent total solids. The resulting laminate is then dried so as to form a relatively non-porous structure, and then is cured at 200° C. for 15 minutes. The product laminate has excellent strength and thermal insulation characteristics.

This laminate is now exposed to gradually increasing temperatures over a period of time to 4 to 5 hours during which the temperature of the laminate structure is increased from about 20° C. to 500° C. and then maintained at this temperature for 24 hours. Following cooling, it is observed that the product ceramic structure has excellent strength and thermal insulation properties.

Examples 18–24

The procedure of Example 16 is repeated, except that in place of the binder composition there are employed the binder compositions of Examples 2 through 8. Results like those obtained in Example 16 are observed in each instance.

We claim:
1. A heterogeneous three-dimensional structure characterized by having relatively high strength and high thermal insulation properties over a temperature range extending from about 20° C. to 1150° C., said structure comprising:
  (a) preformed macroscopic inorganic materials selected from the class consisting of aluminiferous, titaniferous, and siliceous particles having a minimum average size of more than about 100 microns each,
  (b) said inorganic materials being bonded together into a matrix by means of a binder composition, said composition containing up to about 70 weight percent total solids and comprising:
    (1) an inert evaporatable liquid carrier selected from the group consisting of water, polar organic liquids and mixtures thereof,
    (2) at least one inorganic metal oxide refractory binder material capable of fusion at temperatures in excess of about 800° C. and being in the physical form of solid particles having a maximum size of less than about 10 microns each, said refractory binder being dispersable in said carrier,
    (3) an aminoplast modified phenol-aldehyde resole resin substantially completely dissolved in said liquid carrier, said resin having been produced by preforming a water-soluble, water dilutable phenol-aldehyde resin and thereafter admixing therewith a water-soluble, water dilutable condensate of aldehyde and an aminocyandiamide, melamine, and urea,
    (4) a nonmetallic phosphate material selected from the group consisting of phosphoric acid, ammonium phosphates, lower alkyl phosphates, lower alkoxyalkyl phosphates, phosphate esters of phosphoric acid with monohydric lower alkanols, lower alkanolamine salts of phosphoric acid, and mixtures thereof, said phosphate material being substantially completely dissolved in said liquid carrier,
    (5) there being present for each 100 parts by weight of said refractory oxide from about 5 to 30 parts by weight of said resole resin,
    (6) there additionally being present such a quantity of said phosphate material relative to said resole resin that a dry mixture of said resole resin and said phosphate material requires from about 1 through 40 minutes for said resole resin to cure at 120° C., and
  (c) said binder composition having been first applied between contiguous surfaces of said inorganic materials and there after having been exposed to sufficient heat energy substantially to cure the resole resin portion thereof, thereby to form the desired heterogeneous three-dimensional structure.

2. A structure of claim 1 having a bulk density of from about 1 to 3 pounds per cubic foot.

3. A structure of claim 1 having a bulk density of from about 0.5 to 2.2 grams per cubic centimeter.

4. The structure of claim 2 wherein said inorganic materials are siliceous and are in a substantially fibrous and randomly arranged form, the average fiber length to width ratio ranging from about 10:1 to 100,000:1.

5. The structure of claim 3 wherein said inorganic materials are siliceous and are in the form of at least one woven mat.

6. The structure of claim 5 wherein said inorganic materials comprise a plurality of generally parallelly positioned layers which are spaced from and bound to one another by means of said binder composition so as to form a laminate configuration.

References Cited

UNITED STATES PATENTS

| | | | |
|---|---|---|---|
| 3,077,458 | 2/1963 | Quelle et al. | 260—38 |
| 3,124,542 | 3/1964 | Kohn | 260—2.5R |
| 3,348,994 | 10/1967 | Rees et al. | 161—170 |

MURRAY TILLMAN, Primary Examiner

J. C. BLEUTGE, Assistant Examiner

U.S. Cl. X.R.

161—162, 170; 106—41; 260—29.3, 38, 2.5